United States Patent
Golle et al.

(10) Patent No.: US 8,297,581 B2
(45) Date of Patent: Oct. 30, 2012

(54) MOUNTING DEVICE AND METHOD FOR PRODUCING

(76) Inventors: Matthias Golle, Erding (DE); Christoph Hein, Muennerstadt (DE); Kurt Hoehe, Langenau (DE); Matthias Laske, Ulm (DE); Bernd Ruess, Voehringen (DE); Hyunwoo So, Garching (DE)

( * ) Notice: Subject to any disclaimer, the term of this patent is extended or adjusted under 35 U.S.C. 154(b) by 660 days.

(21) Appl. No.: 12/225,548

(22) PCT Filed: Mar. 30, 2007

(86) PCT No.: PCT/EP2007/002906
§ 371 (c)(1),
(2), (4) Date: Oct. 13, 2009

(87) PCT Pub. No.: WO2007/112987
PCT Pub. Date: Oct. 11, 2007

(65) Prior Publication Data
US 2010/0038511 A1 Feb. 18, 2010

(30) Foreign Application Priority Data

Mar. 31, 2006 (DE) .......................... 10 2006 015 100
Mar. 31, 2006 (DE) .......................... 10 2006 015 145

(51) Int. Cl.
*A47B 91/00* (2006.01)
(52) U.S. Cl. .................................................... 248/346.5
(58) Field of Classification Search ............. 248/346.01, 248/346.02, 346.03, 346.04, 346.5; 219/121.72
See application file for complete search history.

(56) References Cited

U.S. PATENT DOCUMENTS

| 2,974,378 | A | | 1/1957 | Lidsky |
| 3,011,226 | A | * | 12/1961 | Menge ............ 411/466 |
| 3,314,119 | A | | 4/1967 | Hill |
| 3,667,337 | A | * | 6/1972 | Burke ............ 411/467 |

(Continued)

FOREIGN PATENT DOCUMENTS
DE 1912744 10/1970
(Continued)

OTHER PUBLICATIONS

European Patent Office; International Preliminary Report on Patentability, Sep. 30, 2008; The International Bureau of WIPO; Geneva, Switzerland.

*Primary Examiner* — Ramon Ramirez
(74) *Attorney, Agent, or Firm* — Marshall & Melhorn LLC

(57) ABSTRACT

The present invention thus relates to a mounting device having a metallic base plate, on which multiple fastening elements are provided, from each of which at least a partial area projects above the base plate. The mounting device is obtainable by incising fastening element blanks into the surface of the metallic base plate while leaving one connection edge per blank in such a way that they each have a web-shaped base area, which comprises the connection edge on one end, and a head area adjoining the base area, which projects laterally beyond the neighboring base area on at least one side. At least one partial area of the blanks is bent out of the base plate around at least one bending edge located in the base area. The projecting edge of the head area adjoining the base area runs at an angle between 0° and 70° in relation to the plane of the base plate after the fastening elements are bent out of the base plate. In addition, the present invention relates to a method for producing this mounting device.

54 Claims, 11 Drawing Sheets

U.S. PATENT DOCUMENTS

| | | |
|---|---|---|
| 3,899,803 A | 8/1975 | Brumlik |
| 6,777,641 B2 | 8/2004 | Cole, III et al. |
| 2003/0192865 A1 | 10/2003 | Cole, III et al. |
| 2006/0163222 A1 | 7/2006 | Dance et al. |
| 2010/0001152 A1* | 1/2010 | Golle et al. ............. 248/220.21 |
| 2012/0006959 A1* | 1/2012 | Braun et al. ............... 248/309.1 |

FOREIGN PATENT DOCUMENTS

| | | |
|---|---|---|
| DE | 4441095 A1 | 5/1996 |
| GB | 1 391 811 | 4/1975 |
| GB | 1 391 811 A | 4/1975 |
| WO | WO 2004/028731 A1 | 4/2004 |

\* cited by examiner

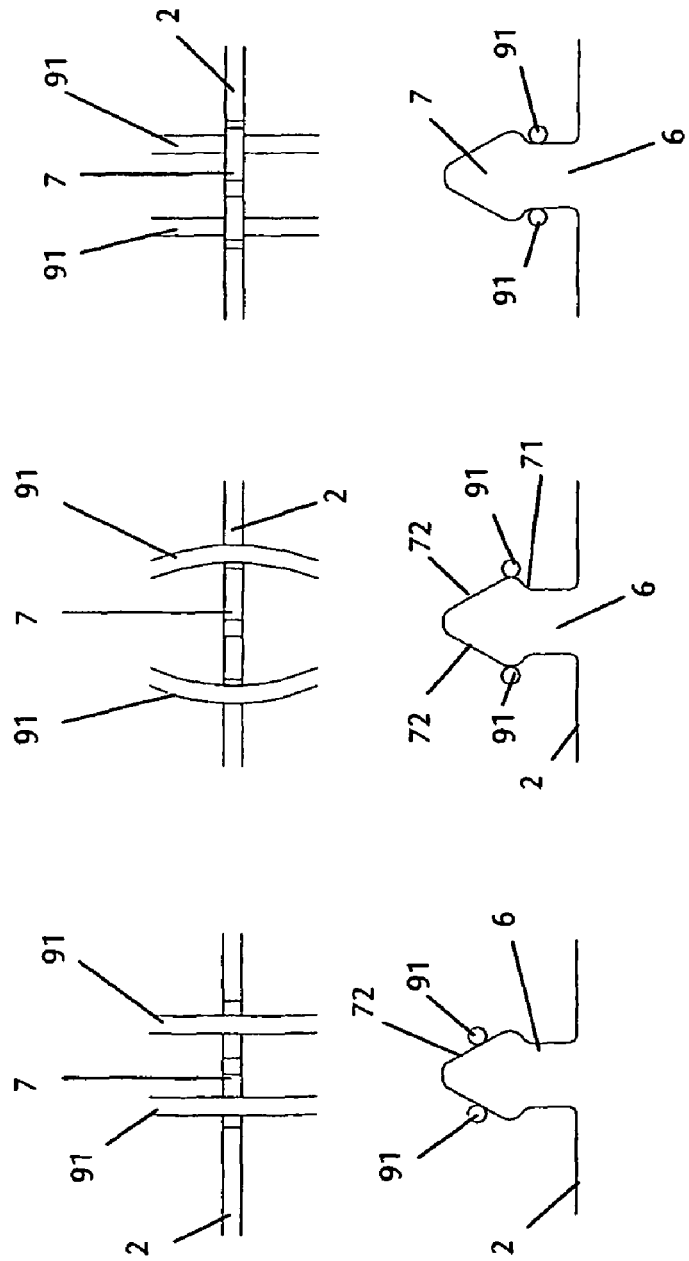

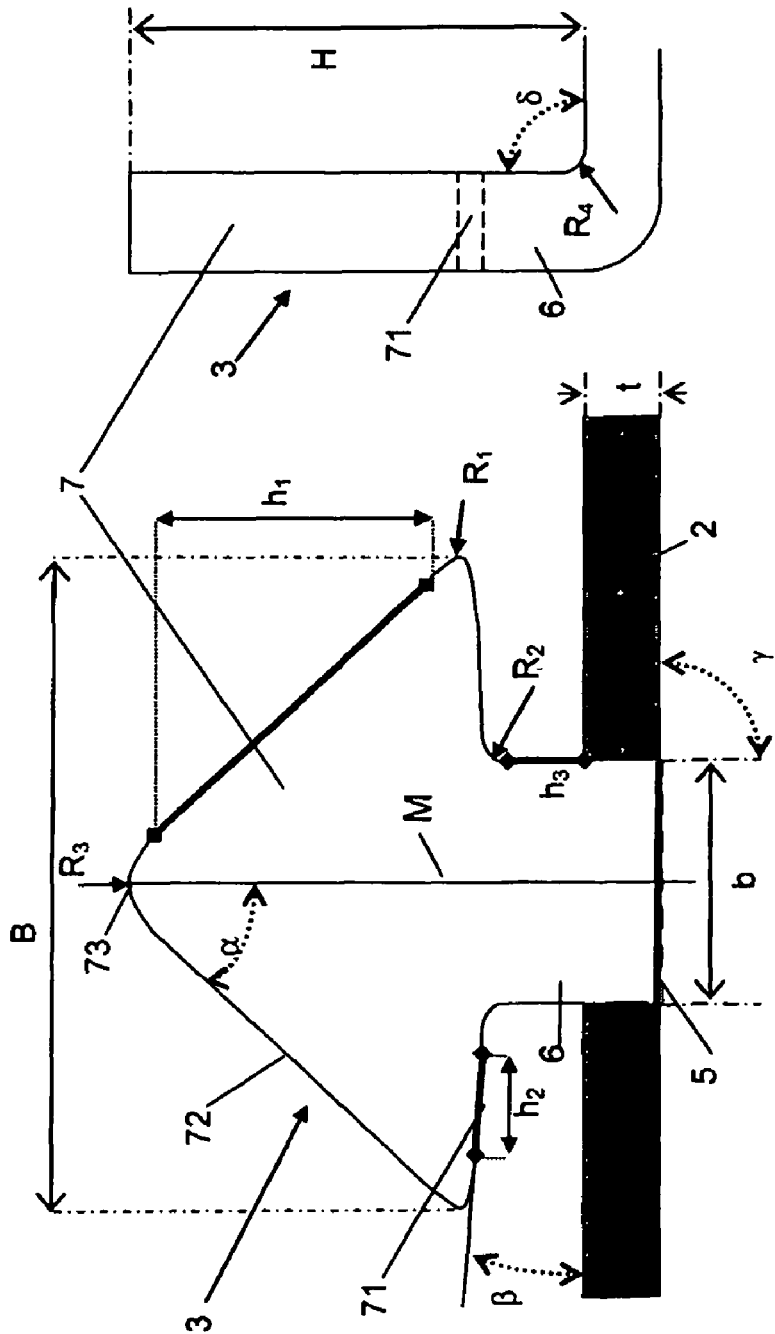

MOUNTING DEVICE AND METHOD FOR PRODUCING

FIELD OF THE INVENTION

The present invention relates to a mounting device having a metallic base plate, on which multiple fastening elements are provided, from each of which at least one partial area projects from the base plate, a method for producing such a mounting device, and a retainer formed using this mounting device.

BACKGROUND OF THE INVENTION

In many industrial and other areas (e.g., construction, automobile construction, domestic, etc.), it is normally necessary to fix metallic components or workpieces or connect them with other components. It is frequently desirable for this purpose to produce the retainers and/or the connections in a simple and rapidly executable way, without special tools, such as welding or screwing tools, being required for fixing the fasteners. In the field of plastic components, such a retainer is achieved, for example, by using hook-and-loop closures as fasteners. However, these plastic hook-and-loop closures are not employable for manifold uses, because they do not have the required durability and temperature stability and/or are not electrically conductive.

A method for producing a metallic mounting device is already known from WO 2004/028731 A1. It is suggested that multiple oblong areas on the surface of a workpiece be caused to melt using an electrode beam, and the molten material be shifted along the longitudinal axis and allowed to solidify again, so that a hole and an area projecting from the surface results in each case. In order to achieve a sufficient length of the projections, the method must be repeated multiple times. The workpiece is to be able to be connected to other workpieces by the structuring of the surface thus resulting, connections of workpieces made of metal and fiber composite material being cited as preferable. A device for generating an electrode beam and a control device for controlling the beam are required for this method. In addition, the method has to be repeated multiple times in order to obtain sufficiently large structures. Therefore, the structuring of the surface according to this method is relatively difficult and complex. High precision in the production is also necessary. Furthermore, it is also not possible with the aid of the method to implement the projections with predefined specific shapes, which would be desirable for adapting the adhesive properties of the structured surface of the workpiece to the material structure of the workpiece to be connected.

Because of the high cost and time pressure in production in industrial operations, in particular in the automobile industry, there is a need, as already noted above, for mounting devices, by which metallic components and devices in particular may be fixed and/or fastened rapidly and easily, without additional tools or complex production methods being necessary. In addition, the mounting device is to be durable and temperature stable. The object of the present invention is accordingly to specify a mounting device of this type and a method for its production, which ensures secure retention of components in spite of relatively simple production, without additional tools being necessary for the fastening, and which is temperature stable.

SUMMARY OF THE INVENTION

The present invention thus relates to a mounting device having a metallic base plate, on which multiple fastening elements are provided, from each of which at least one partial area projects from the base plate, which is obtainable by incising fastening element blanks into the surface of the metallic base plate, while leaving at least one connection edge per blank. The blanks are predefined in such a way that they each have a web-shaped base area, which comprises the connection edge on one end, and a head area adjoining the base area. The head area projects laterally beyond at least one side of the neighboring base area. It is sufficient if the head area only projects beyond the directly neighboring part of the base area, if the base area is not implemented as rectangular. At least a partial area of the blank is bent out of the base plate around at least one bending edge located in the base area. The projecting edge of the head area adjoining the base area runs at an angle between 0° and 70° in relation to the plane of the base plate after the fastening element is bent out of the base plate. The projecting head areas of the fastening projections may engage in suitable counterparts and thus attach the mounting device to the counterpart.

The basic idea of the present invention is accordingly that multiple contours, by which the blanks are produced, are incised into the metallic base plate in order to produce multiple fastening elements by bending in a second step, from each of which at least a partial area projects from the metallic base plate and is shaped hooked. It is to be ensured that the contours incised into the base plate are not implemented as closed per se and at least one connection edge is left. Incising contours into the base plate is to be understood as cutting through the base plate completely in the area of the contours. By incising the contours, the blanks may be defined in shape and size easily and reproducible fastening elements may be produced.

Due to the simple construction of the mounting device according to the present invention, it is relatively uncomplicated and rapid to produce by simple metal processing techniques, such as punching, cutting, and bending. Moreover, the capability of the mounting device of clawing into a workpiece or component is increased and therefore the retention force of the mounting device is improved overall by the hooked implementation of the projecting head areas, in contrast to the essentially rounded projections of WO 2004/028731 A1.

A mounting device completely comprising metal is obtained, which may be used as a "metallic hook-and-loop closure". It may be loaded with high tensile forces and has very good stability even at very high or very low temperatures. The mounting device may be connected to a workpiece or component without further steps, such as welding or screwing, having to be performed. However, it is nonetheless possible to combine such additional fastening steps with the mounting device according to the present invention (e.g., pre-mounting of components using the mounting device according to the present invention and subsequent, final fastening by welding or screwing). The advantages of the metallic workpiece are also displayed here, because all types of metal connection are usable i.e., also soldering, or riveting, and clinching.

The fastening elements may, but do not have to be implemented symmetrically. For example, a projecting head area may only project on one side of the base area. In addition to shapes which are based on half arrowheads or half mushrooms, those shapes which have a setback at the upper end of the web-shaped base area, below the head area projecting on one side, suggest themselves. These shapes are roughly similar to a crochet hook head. In this context, reference is made in the following to a hooked head area design.

However, it is preferable if projecting areas are provided on both sides of the base area, because the stability of the fastening in the counterpart is thus increased. In the case of projections on both sides, the fastening elements and/or the blanks incised in the base plate are essentially mirror-symmetric in relation to their longitudinal central axis in one embodiment. Suitable shapes of the head area are then similar, for example, to an arrowhead having angled or rounded lower edges neighboring the base area and projecting laterally beyond it. Instead of a head area tapering to a point on its free end, this area may also be rounded, so that an essentially mushroom-cap-shaped head results. An oblong, more droplet-shaped embodiment is also conceivable. Overall, the fastening element is preferably implemented as arrow-shaped or mushroom-shaped in this first two-sided embodiment.

In another embodiment, a two-sided configuration of the projections may also be implemented in such a way that a setback is provided on both longitudinal sides of the web-shaped base area below the head area, which possibly projects at different heights on the respective sides, the setbacks being able to be situated offset to one another on both longitudinal sides and the actual head area also being designed asymmetrically.

In any case, it is preferable if the head area tapers toward its free end, because this makes the insertion into the fastening opening of the counterpart easier.

The mounting device according to the present invention may be used in principle with greatly varying counterparts. The counterpart is preferably implemented as a crocheted fabric, woven fabric, braid, knitted fabric, looped fleece, plush, or scrim made of plastic, glass fibers, ceramic fibers, or metal. The structures may be composed of monofilaments or multifilaments, they may comprise thread sections or endless threads. The selection of the counterpart is directed to the detailed design of the head area of the fastening elements. For fastening elements having symmetrical or approximately symmetrical design of the head area, woven fabrics are especially preferred as the counterpart. For mounting devices having an asymmetrical design of the head area, crocheted fabrics, braids, knitted fabrics, scrims, looped fleeces, or plush, i.e., structures having low symmetry, are especially preferred.

Counterparts made of metal are especially suitable, which additionally have the advantage that a metallic overall composite made of mounting device and counterpart results, which has a high resistance to high and low temperatures, which not only allows use under extreme conditions, but rather also permits special application steps such as further processing using methods typical for metallic materials or sterilization by heat or radiation. For example, welding, soldering, flanging, riveting, clinching, and screwing may be cited here as further processing methods. Furthermore, the metallic overall composite may have electrical conductivity or magnetic properties. Suitable counterparts comprise, for example, corrosion-resistant or acid-resistant steel, in particular stainless steel, preferably austenitic stainless steel or austenitic molybdenum (stainless) steel, as well as spring steel. High temperature alloys such as nickel alloys may also be used. Thread-based structures made of plastic are also suitable in principle, preferably those having adequate mechanical strength, chemical resistance, and temperature resistance. Because of their resistance, glass fiber and ceramic fiber structures also suggest themselves.

A mounting device according to the present invention having a symmetrical or approximately symmetrical design of the head area is especially suitable for use with a woven fabric as the counterpart. The mounting device is expediently implemented in such a way that a fastening element engages in a woven fabric mesh, referred to in the following in simplified form as mesh, and the head area catches in the mesh. It typically occurs in such a way that the mesh expands upon insertion of the head of the fastening element and subsequently contracts again behind the head after it is pushed through. The threads of the woven fabric forming the mesh come to rest behind the projecting edges of the head area and catch the head in this way. The present invention thus exploits the intrinsic restoring force of the woven fabric to produce the connection between fastening elements and counterpart.

The size and shape of the meshes is expediently directed to the fastening elements to be mounted. The meshes are preferably rectangular, square, or have the shape of a parallelogram. To make the insertion of the fastening elements of the mounting device into the woven fabric easier, the latter preferably has an open screen area of 25 to 75%. An open screen area of 40 to 70% is especially preferred, and 50 to 65% is particularly preferred. Above all, the dimensions of the head areas of the fastening elements are to be considered for the mesh size. Preferred mesh widths of 0.3 to 18 mm, preferably 0.3 to 10 mm, and particularly 0.3 to 3 mm are cited solely as examples here.

When tailoring the size and shape of the (approximately) mirror-symmetrically designed fastening elements to the woven fabric counterpart to be fastened, it also plays a role whether the fastening is to be detachable or permanent. Both are possible in principle in the scope of the present invention. In general here, the connection is more easily detachable the more obtuse the angle between the plane the base plate and the edge of the head area projecting (approximately) symmetrically on both sides, which adjoins the base area, and the shorter the projection section. For example, a lower head section projecting parallel to the base plate plane is thus more difficult to detach from a composite of woven fabric and mounting device than a head section of equal length which runs at an angle of 30°, for example, to the base plate plane. The present invention is especially suitable for producing detachable connections between the mounting device and a woven fabric. Above all for applications of this type, the angle between the base plate plane and the projecting lower edge of the head area after bending out of the base plate is expediently 0° to 60° and especially preferably 0° to 45°.

The angles specified for determining the course of the lower sections of the head area projecting on both sides in relation to the base plate plane do not mean that the projecting edge automatically runs linearly. Rather, it may also run in a curve. The inclination to the base plate is then determined by the angle between the base plate plane and a tangent applied to the curved edge of the projecting head area. If the curvature of the projecting lower head area is not constant, all tangents applied over the entire longitudinal extension of the projecting section run at an angle which is at least 0° and at most 70°. The lower edges of the head projecting (nearly) symmetrically on both sides may also be composed of multiple linear edge sections having different inclinations. It is also true here that the angle of each edge section lies in the range claimed. In the event of changing inclination of the projecting edge sections, the course of the angle is preferably such that the inclination in a section closer to the base area is less—i.e., closer to 0°—and steeper—closer to 70°—in sections projecting further. For all of the above variations, the extreme ends of the projecting lower edges of the head area are not also to be considered when establishing the inclination, i.e., angles outside the specified range may exist here. Thus, this applies to the transition areas between projection section and base area on one side and between projection section and free, upper end area of the head on the other side. A continuous transition of the various sections of the fastening element into one another is to be possible in these transition areas.

The tapering of the free end of the base area is, as noted, especially preferable, because the head may thus be inserted more easily into an opening of the counterpart to be fastened. In the preferred use according to the present invention of a woven fabric as a counterpart, the threads and/or metal wires may be pushed apart more easily using a tapering head, so that less force application is necessary. In addition, a mesh is hit with significantly greater probability than without tapering of the head, through which the number of "threaded" fastening elements per unit of woven fabric area increases. Vice versa, less exact tailoring of the dimensions of mounting device and counterpart to one another is necessary to achieve a sufficient number of fastening points.

The tapering of the head end is preferably implemented in such a way that the upper lateral edge running toward the free end of the head area forms an angle of 5° to 85°, preferably 15° to 60°, and particularly 25° to 45° in relation to a straight line running through the tip of the head perpendicularly to the base plate. Both upper lateral edges may be at the same angle to the straight line described. However, it is also possible that the angles differ and an asymmetrical head is formed. This may be advantageous, for example, if the join direction in which the fastening elements are inserted into the counterpart does not run perpendicularly to the plane the base plate. In order to make joining in a predefined direction easier, for example, the first lateral edge of the fastening element may be implemented as longer and less steep than the other lateral edge of the head. The inclination of the first lateral edge expediently essentially corresponds to the join direction.

To allow sufficient fastening of the mounting device to the woven fabric counterpart at all, it is expedient for the width by which the head area projects laterally beyond the adjoining base area to correspond to at least 0.3 times, preferably at least 0.5 times the diameter of the woven fabric threads. At a lower width, there is the danger that the head of the fastening element may not catch sufficiently behind the woven fabric threads and will slip unintentionally out of the mesh. In addition, it is to be ensured that the base area is sufficiently long, so that the head area of the fastening element may come to rest behind the woven fabric thread. Therefore, the length by which the web-shaped base area projects above the base plate is expediently at least 1.4 times, preferably essentially double, the thread diameter.

For example, woven fabrics made of threads having a diameter of 0.1 mm to 3 mm and preferably 0.2 mm to 2 mm are suitable as counterparts of the present invention. Especially suitable thread diameters are in the range from 0.3 mm to 1 mm. By variation of the thread thickness, the restoring force and thus the structural elasticity of the counterpart may be influenced in a targeted way. The thinner the threads are, the more elastic the composite. The threads may have a uniform thread thickness in the entire woven fabric. However, is also possible to vary the thread thicknesses in the woven fabric and to use warp and weft threads of different diameters, for example, to obtain woven fabrics having anisotropic properties. In regard to the tailoring described above of the shape and dimensions of the fastening elements to the thread diameter, the diameters of those threads which are located in the neighborhood of the fastening elements and which these engage behind are to be accordingly considered.

In addition to the expected tensile and shear strain, inter alia, the structural elasticity of the woven fabric necessary for producing and maintaining the hook-and-loop connection are decisive for the selection of the thread and/or wire diameter. The threads must be able to be displaced laterally toward one another without too large a force application upon insertion of the fastening elements and then spring back with sufficient force to provide a connection having the desired retention force. For reasons of cost and in regard to saving weight, the diameter is not to be selected as unnecessarily large. In addition, threads and/or wires having a round cross-section are preferred, because the fastening elements may slide past these more easily and the reversibility improves with detachable connections.

The threads behind which the head area of the fastening elements come to rest is arbitrary in principle and is a function, inter alia, of the orientation of the head area to the woven fabric. For example, the projecting section of the head may engage behind two neighboring warp threads or two neighboring weft threads of the woven fabric. In the event of a diagonal attitude of the head area to the fabric structure, however, a weft thread on one side and a warp thread on the other side of the head which crosses the weft thread may have the projecting sections engage behind them.

For especially secure fastening of the mounting device to the counterpart, it is preferable if the fastening elements are oriented differently on the base plate. Therefore, a varying orientation of the fastening elements and their projecting head areas to the woven fabric structure of the counterpart also results, which in turn causes the fastening elements to be anchored with greater tension in the woven fabric. The orientation of the fastening elements may be bidirectional or multidirectional. With a bidirectional configuration of the fastening elements on the base plate, it is preferable if the faces of the head areas of the first group of fastening elements are rotated at an angle of 90° in relation to the faces of the head areas of the second group of the fastening elements. The individual fastening elements of the two groups are expediently each distributed uniformly over the base plate to obtain the most uniform possible tension distribution and uniform retention force in the composite made of mounting device and counterpart. However, other angular configurations and other distributions of the fastening elements are also conceivable, for example, to achieve retention forces which vary in a targeted way over the area of the mounting device.

In a preferred variation of the present invention, the web-like base area of the fastening elements is implemented as strip-shaped. The connection edge is expediently formed in this embodiment by one of the short lateral edges of the strip-like web. The web width does not have to be uniform over the entire length of the base area. For reasons of stability, for example, it may be advisable to reinforce the area at which the fastening element is attached to the base plate and correspondingly make the web width largest in the area of the connection edge. In such a case, a smooth curve of the edge is preferred over a staged edge. To simplify the manufacturing, the web-like base area is essentially rectangular.

In another embodiment, the mounting device is attached in a counterpart by hooking of an asymmetric, hooked head area in a counterpart. It is possible in principle, as already noted, to situate multiple hooked head areas on the base area, it being preferable to situate the possibly multiple hooks on both sides of the head area. Furthermore, as already noted, a setback and/or a notch may be provided on the upper end of the base area. In the meaning of the present invention, the head area must only project laterally beyond the inner end of the setback and/or the notch as the upper edge of the base area. As in the embodiment described above, a bending edge is to be provided, around which the base area, which the incised contour comprises, inter alia, is bent out of the surface of the base plate.

The hooked implementation of the head area is typically predefined directly by the contour of the blank, in addition, the head area may be twisted around its longitudinal axis after being placed upright. The counterpart to be fastened may then also be hooked and thus be retained on the screw-like contour thus resulting. Combinations of twisting with projections and/or barbs already predefined in the blank are also conceivable in these variations. The contour of the hooked head area may be designed arbitrarily in principle in all cases. The implementation of the hooked head areas may thus be tailored to the material composition of the workpiece to be connected to the mounting device and the retention force of the mounting device may be optimized. The hooked head area is typically implemented in the shape of a half arrow, i.e., similar to the shape of a 1 or in the form of a crochet hook head, because the shapes are especially simple to produce and have good properties in regard to their connection capabilities with counterparts.

If the hooked implementation of the head area is predefined by the contour of the blank, is preferable to provide one or more notches and/or recesses or setbacks in the head area. These notches have the object of causing hooking or meshing of the fastening elements in the counterpart and thus producing a connection between counterpart and mounting device. The notches are expediently provided in the lateral areas of the head area. If notches and/or recesses are provided on both lateral areas of the base area neighboring the head area, it is especially preferable to implement them differently. The recess closest to the bending edge spans an angle between 0° and 70° with its upper end, i.e., the lower edge of the projection, in relation to the plane of the base plate. The notch closest to the head-side end, in contrast, may also form a barb, i.e., its side facing toward the tip may span a negative angle to the plane of the base plate, e.g., up to −45°.

Due to the at least partially hooked implementation of the fastening elements, they engage solidly in a counterpart, and a stable connection is thus formed between the base plate and the counterpart. To increase the stability of the connection further, it is expedient for the surface of the counterpart to be implemented as structured, so that the largest possible attack area is offered for the fastening elements. The counterpart, as already noted, is preferably implemented as a crocheted fabric, woven fabric, braid, knitted fabric, looped fleece, scrim, or plush made of plastic, glass fibers, ceramic fibers, or metal. For plush, looped fleece, and knitted fabric, structures having open or preferably closed loops are possible. Looped formations may also be formed by the overlap of multiple tangled threads.

The counterpart having its tangled threads offers many varying possibilities for entangling the projections of the fastening elements for the mounting device. When detaching the fastening elements, tearing of loops and/or individual threads may occur in isolated places. Because of the large number of threads, this does not result in significant impairment of the function of the counterpart, however.

In the case of crocheted fabrics, woven fabrics, knitted fabrics, braids, scrims, plush, or fleeces as counterparts, these may have completely plastic deformation properties in principle, but they preferably deform plastic-elastically or purely elastically. The structural elasticity of the counterparts may be influenced in a targeted way, for example, by varying the thread thicknesses. In addition, anisotropic properties may be obtained by different thread thicknesses in warp and weft threads. In simple structures, in particular in crocheted fabrics and woven fabrics, the composite becomes more elastic the thinner the threads. The loop or eye diameter of the counterpart is preferably 0.5 to 1.5 mm, especially preferably 1 mm, deviations of the individual diameters in the range from 40% to 200% of the starting value being possible due to production. Furthermore, the loops or eyes may occur in bundles, i.e., an especially high concentration may occur in specific areas of the counterpart or they may be situated distributed uniformly over the entire counterpart area.

The dimensions of the counterpart and the thread used for this purpose may be implemented arbitrarily in principle, they being expediently tailored to the dimensions and geometry of the mounting device. In a preferred embodiment, the thickness of the plush, woven fabric, knitted fabric, or crocheted fabric is 1 to 3 mm, especially preferably approximately 2 mm, and the wire diameter is 0.008 to 3 mm, preferably 0.02 to 1 mm, and especially preferably 0.02 to 0.5 mm.

The fastening elements are bent out of the base plate around at least one bending edge located in the base area and project above it according to the present invention. The bending out is preferably performed around only one single bending edge. This is expediently identical to the connection edge at which the fastening element hangs on the base plate. This variation is distinguished in that the fastening elements have more or less no elasticity and the elasticity of the composite results solely from the counterpart, for example, a woven fabric having displaceable threads, or a crocheted fabric, knitted fabric, braid, scrim, plush, or fleece. In another variation, the bending edge is not coincident with the connection edge, but rather lies in an area between connection edge and head area. Therefore, only a part of the base area projects above the base plate, while another part of the base area remains lying in the base plate plane. In this constellation, the part of the base area which is not bent out may act as a spring for the fastening element in the orthogonal direction to the plane of the base plate, by absorbing the forces acting in this direction on the fastening element by bending around the connection edge. It is also possible to bend the resilient base area out of the base plate plane already during the production of the mounting device. In this case, in the web-shaped base area, a bending edge is present in the area of the connection edge and a bending edge running transversely to its longitudinal extension direction is provided in the area between connection edge and head area.

In another embodiment, the base area is curved in the blank, i.e., before being bent out of the base plate plane. In particular, the base area is implemented as curved essentially L-shaped, the angle of curvature being between 70° and 110°, preferably essentially 90°. The bending out from the base plate is expediently performed in such a way that the bending edge lies in the curved area of the base area. In particular, the bending edge lies in an extension of a lateral edge of the base area. As in the variations described above, a base area part results in this way which may have resilient properties in the event of appropriate material selection, from which the remaining part of the base area subsequently projects above the base plate plane. A further bending edge may also be possibly formed here by the connection edge, so that the resilient base area part is also raised out of the base plate plane. The embodiment having L-shaped curved base area may be combined especially advantageously with the asymmetric head design.

Base and head areas of the fastening elements are expediently each essentially planar. This means that the production of the fastening elements may be achieved solely by cutting out planar areas from the base plate and bending these areas out of the base plate plane. The production of the mounting device is thus simplified, because further, complex production steps are not necessary.

However, it is also possible in principle, if also currently less preferable, to provide areas of the head area projecting from the plane predefined by the base plate plane. However, this increases the manufacturing complexity and also only appears advisable if irreversible fastening of the mounting device to the counterpart is intended. The areas projecting out of the head plane may be generated, for example, by cranking an edge section of the head area out of the head plane. The cranked edge section may be the tapering tip of the head area, for example. In addition, it is also possible to deform the base area—possibly also in its possibly provided curved area—or the area of the bending edge. This may be performed in the form of stiffening beads, for example.

In order to ensure that the overwhelming majority of the fastening elements catch and/or claw or hook in a counterpart to fasten the mounting device, it is expedient to bend them at an angle of 75° to 115°, preferably 80° to 100°, and especially preferably essentially 90° out of the base plate. The probability that a head area of the fastening element may catch in a counterpart is thus increased. For such fastening elements having more than one bending edge in the base area, the specified bending angle relates to the free end section of the fastening element oriented beyond the bending edge lying further toward the free end of the fastening element, which comprises the head area. In contrast, the angle at which the resilient base area part, which possibly hangs via the connection edge on the base plate, is bent out of the base plate is not meant.

The hooked head areas may be bent out of the metallic base plate on both sides thereof. The mounting device may thus accommodate workpieces on both sides of the metallic base plate. In a preferred embodiment, the hooked head areas are only bent out on one side of the base plate, by which the number of fastening elements per unit of area and thus the retention force are increased. In addition, the production is thus simplified. The number of fastening elements is directed, also as a function of their size and stability, to the requirements for the durability of the connection to be achieved and the counterpart to be fastened. Typically, more than one single fastening element is provided per base plate, for example, 2 to 36, preferably 4 to 18 fastening projections per square centimeter of base plate area, this density possibly only being provided in the areas of the base plate which have fastening projections at all.

To avoid high manufacturing outlay and to equalize the retention force, the fastening elements are preferably implemented essentially identically and are distributed essentially uniformly on the surface of the base plate. This does not preclude the possibility already cited of distributing identical fastening elements on the base plate in different orientations to the structure of the counterpart. Furthermore, it is also possible to combine differently designed fastening elements in a mounting device.

The shape and size of the fastening elements are directed to the type of intended use. The thickness of the metallic base plate—and thus the thickness of the fastening elements—is expediently dimensioned to the shear and tensile strain to be expected during and after the connection to the counterpart to be fastened. This is also true for the other dimensions of the fastening elements. The metallic base plate is preferably implemented as a thin metal sheet, preferably made of stainless steel. In the case of resilient base areas, spring steel is expediently used as the material for the base plate. Preferred sheet thicknesses are, for example, from 0.1 to 10 mm, especially preferably 0.1 to 5 mm, and particularly 0.1 to 2 mm. This embodiment is especially well suitable for incising blanks and/or bending them. In principle, only a partial area of a metal sheet or a metal foil may also be implemented as a base plate. To automate the production, the metal sheet is expediently used in strip form. Multiple base plates situated one after another having partially projecting fastening elements are then shaped into the strip, and the individual mounting devices are cut out of the strip immediately thereafter or only shortly before use. The metal strip is preferably implemented as an endless strip.

In order to ensure that the mounting device and the counterpart are situated in a predefined position to one another before the actual hooking of the fastening elements in the counterpart, the mounting device and the counterpart may have prefixing elements corresponding to one another. The prefixing elements are tailored to one another in such a way that the desired positioning of the counterpart and the mounting device to one another is achieved. The prefixing elements are preferably implemented so that they engage in one another in a formfitting way.

The base plate may either be provided as a separate part or may be a module in a larger component. For example, the base plate may be an edge section of a flat metallic component. In another variation, the separate mounting device is attached to a support component using its base plate. The support component is preferably implemented from metal and the mounting device is attached to the support component in a suitable way, for example, using laser welding or an otherwise typical welding method. Partially projecting fastening elements are expediently implemented on the base plate of the mounting device on only one side, and the flat side of the base plate presses against the support component. In addition, the counterpart may also be attached to a further support component or integrated therein.

Furthermore, the object on which the present invention is based is achieved by a method for producing the mounting device according to the present invention, in which multiple fastening element blanks are incised into a metallic base plate while leaving at least one connection edge per blank. The blanks are to be predefined in such a way that they each comprise a web-shaped base area, which comprises the connection edge on one end, and a head area adjoining the base area. The head area projects laterally beyond the neighboring base area on at least one side. At least a partial area of these blanks is bent out of the base plate around at least one bending edge located in the base area. The projecting edge of the head area adjoining the base area runs at an angle between 0° and 70° to the plane of the base plate after the bending.

The blanks incised in the base plate are expediently produced using a laser beam or by punching. Through the use of a laser beam, it is possible to incise even relatively small blanks precisely into the metallic base plate and thus achieve the most uniform possible implementation of the blanks. Punching, as a relatively simple metal processing technology, simplifies and accelerates the production procedure, because multiple blanks may be punched out at the same time. Above all in the latter case it is preferable from a manufacturing viewpoint if a relief is generated around the blanks as they are incised. The width of the relief is preferably one to three times the thickness of the base plate, preferably up to 2.5 times. The reliefs surrounding the fastening projections—except for the connection section—make bending the blanks out of the base plate easier, for example. For this purpose, a rolling cutting process in the continuous method or a method using a progressive die may be executed. The production of cranked areas may also be performed in this way. It is possible in this way to execute the various steps of the method in one work cycle and/or by one die, and thus further optimize the overall production method. Instead of narrow reliefs, which are advantageous in principle for greater stability, in some applications larger cutouts may also be used.

In addition to mechanical bending, laser radiation may also be used for bending the fastening projections, the fastening projections may also be produced using thermal bending. Both laser bending and also thermal bending are particularly suitable if only small piece counts are to be produced.

A possibility for the production of fastening projections comprises situating them as essentially diametrically opposite pairs. The blanks of fastening projections of this type are generated in such a way that a web delimited by the connection sections remains between the blanks which are cut free and the blanks are bent out of the base plate toward one another. The web expediently has a width, i.e., a distance between the connection sections of the fastening projections, of 0.2 to 4 mm, preferably 0.5 to 2 mm. Alternatively, it is also possible not to take the material for the blanks from the exterior of the blanks, but rather from the intermediate space between the pair. A pair of essentially diametrically opposite fastening projections is then generated, for example, in such a way that the blanks are situated in the base plate having connection sections facing away from one another and are bent out of the base plate away from one another. A combination of both variations is also possible in principle.

Alternatively, arrays or array sections of individual fastening projections or other configurations oriented in a raster are also conceivable. In array configurations, multiple fastening projections may be assembled into groups, in particular pairs, and their blanks are then not separated by webs after being cut out. Asymmetrical fastening elements may be situated within a group in such a way that neighboring elements are situated parallel to one another or mirror symmetric to one another. Within a group, neighboring fastening elements at each point have a minimum distance of 0.1 mm, preferably 0.17 mm, and especially preferably 0.2 mm before the bending out of the base plate.

Preferred areas of application of the described mounting devices according to the present invention are fastening and retaining components and devices in construction, in medical technology, in the domestic field, and in metalwork. In metalwork, the retention and fastening of metal parts in the automobile sector is especially preferred. The mounting device according to the present invention is particularly used there for attaching heat shields, noise dampers, and engine encapsulations, and for vibration damping of metallic connections.

Furthermore, the mounting device according to the present invention may be used for fastening components to heaters and stoves and for fastening the casing of pipes. Because the mounting device according to the present invention is implemented from metal, it is also especially suitable for being used in the field of component retainers and component connections in high-temperature or low-temperature applications, and for conducting electrical current.

BRIEF DESCRIPTION OF THE DRAWINGS

In the following, the present invention is described further on the basis of exemplary embodiments illustrated in the drawing. However, these examples are solely intended for explanation. The present invention is not restricted thereto. The figures show schematically:

FIGS. 4(a) to 4(c) the procedure of fastening a mounting device according to the present invention to a woven fabric counterpart;

FIG. 5 a fastening element of a mounting device according to the present invention in a top view of one of its lateral faces;

FIG. 6 the fastening element from FIG. 5 in a view of one of its lateral edges;

DETAILED DESCRIPTION OF THE PREFERRED EMBODIMENTS

In the various embodiments of the present invention illustrated in the figures, identical components are provided with identical reference signs.

Figure 1:
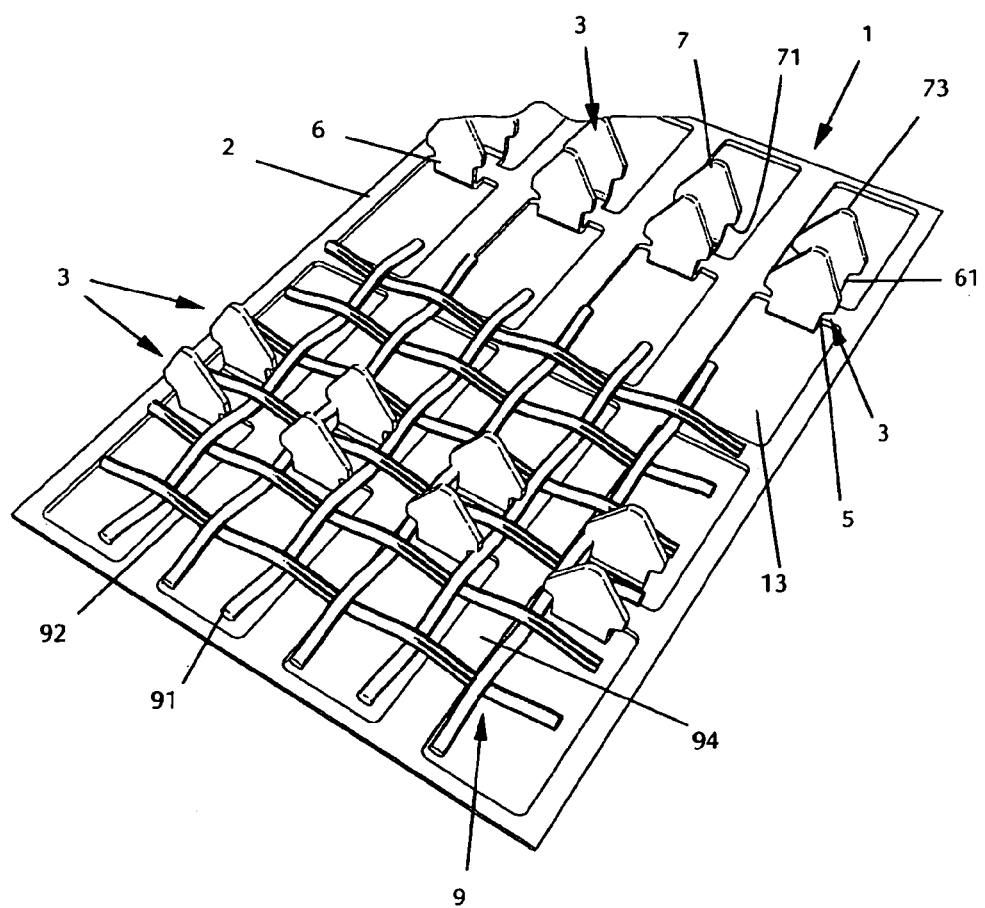
FIG. 1 a perspective partial view of a mounting device according to the present invention, partially fastened to a counterpart made of wire woven fabric.

FIG. 1 shows a first exemplary embodiment of a mounting device 1 according to the present invention in a partial top view. The mounting device 1 according to the present invention comprises a base plate 2, which may comprise stainless steel, for example. Multiple fastening elements 3 project above one surface of the base plate 2 essentially perpendicularly to the plane of the base plate 2. The fastening elements 3 are distributed in two parallel double rows on the surface of the base plate 2. All fastening elements 3 are implemented essentially identically and have a mushroom shape. The web-shaped base area 6, which is implemented as essentially rectangular, adjoins a connection edge 5, via which the fastening elements 3 are connected to the base plate 2. A head area 7 adjoins to the base area 6. The lower edges 71 of the head area 7 adjoining the lateral edges 61 of the base area 6 project on both sides beyond the base area 6. Subsequently, the head area 7 tapers in the direction toward its tip 73.

The lower area of FIG. 1 shows the mounting device 1 according to the present invention connected to a counterpart 9. The counterpart 9 is a metal woven fabric which is formed by weft threads 91 and warp threads 92 made of stainless steel. Warp and weft threads delimit essentially square meshes 94, which are used to receive the fastening elements 3 of the mounting device 1 according to the present invention. As is shown, a fastening element 3 is not provided for each mesh 94. In those meshes 94 which have received a fastening element 3, the head area 7 projects above the woven fabric 9 in each case. Two neighboring weft threads 91 come to rest in each case on the diametrically opposite lateral edges 61 of the base area 6 of a fastening element 3. The projecting lower edges 71 of the head area 7 each lie above a weft thread 91 and the head area 7 thus catches behind the woven fabric 9.

Figure 2:
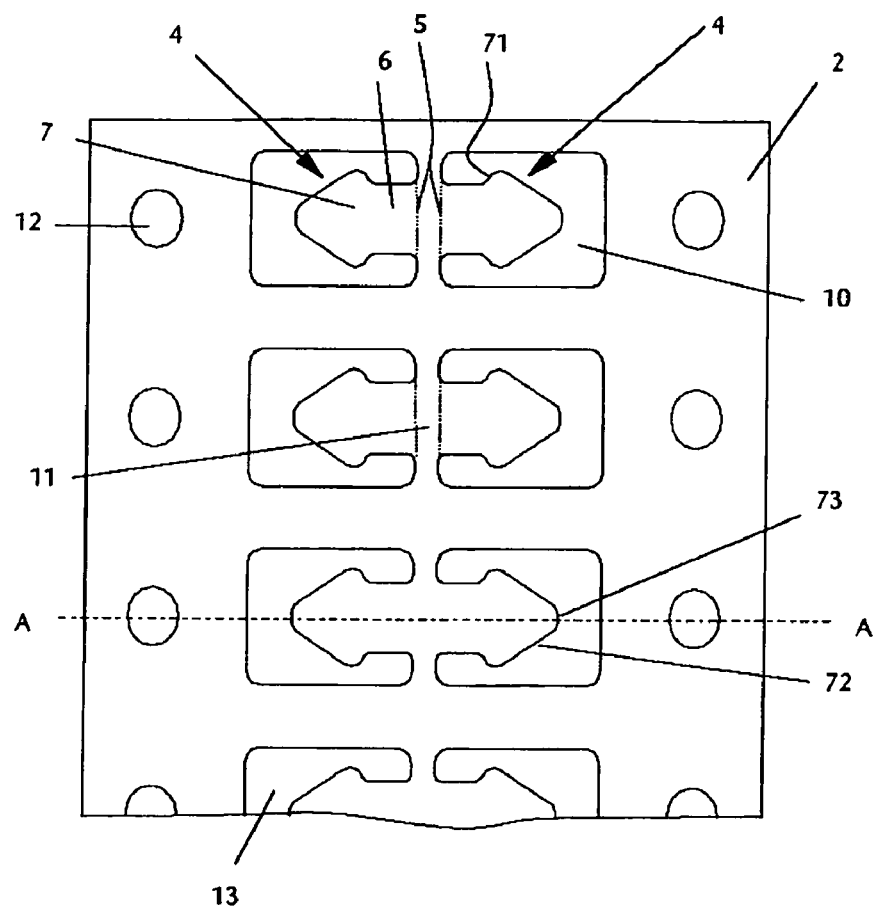
FIG. 2 a partial top view of a preliminary stage of a mounting device according to the present invention.

FIG. 2 illustrates the production of a mounting device 1 according to the present invention. The preliminary stage shown may, for example, be used for producing one of the double rows of the fastening elements 3 shown in FIG. 1. The preliminary stage comprises an endless strip, for example, made of stainless steel, which corresponds to the base plate 2. Two rows of essentially mirror-reversed blanks 4 are punched into the base plate 2, whose external contour corresponds to that of the later fastening elements 3. A larger cutout 10 is punched free around each of the blanks 4. The blanks 4 are connected to the base plate 2 along the connection edges 5, diametrically opposite blanks 4 each being separated from one another by a web 11. The blanks 4 have, like the fastening elements 3 of FIG. 1, a strip-shaped, essentially rectangular base area 6, which the lower projecting edges 71 of the head area adjoin, projecting at an obtuse angle on both sides. The free end of the head having the lateral edges 72 is implemented as essentially triangular and tapers toward the rounded tip 73. All blanks 4 are symmetrical in regard to their longitudinal central axes (line A-A). The openings identified by 12 are retention and transport openings for the manufacturing die, which may be removed in the finished mounting device.

Figure 3:
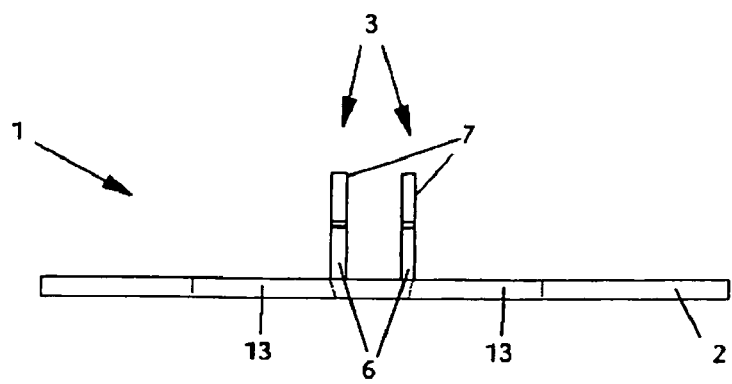
FIG. 3 a side view of a mounting device according to the present invention, manufactured from the preliminary stage of FIG. 2.

After the blanks 4 are cut free from the base plate 2, they are placed upright out of the plane of the base plate 2 by bending around the connection edges 5. FIG. 3 shows the result in a view of the lateral edges of the fastening elements 3, which have resulted from the blanks 4. As shown in this figure, the blanks 4 are bent by essentially 90° out of the plane of the base plate 2, so that the fastening elements 3 having their base area 6 and their head area 7 are essentially perpendicular to the base plate 2. Openings 13 are now provided at the point at which the blanks 4 were previously located in the base plate 2.

FIGS. 4(a) through 4(c) illustrate the way in which a connection of mounting device 1 and the woven fabric 9 as the counterpart of the mounting device corresponding to FIG. 1 is produced. The lower row of figures each show a cross-section through the plane of a fastening element 3 and two neighboring weft threads 91. The upper row of figures each show a top view of the tip of the head 7 of the particular composite.

During the fastening procedure, the mounting device 1, having the head areas 7 of the fastening elements 3 in front, is first moved toward the woven fabric 9 to be fastened and thus also toward the weft threads 91. The tapering points of the head areas 7 direct the fastening elements 3 in such a way that they each come to rest having their head areas 7 between two neighboring weft threads 91. As the fastening elements 3 are advanced, the head areas 7 slip ever further between the weft threads 91. The lateral edges 72 of the heads 7, which run diagonally away from one another, push the neighboring weft threads 91 further and further apart until the weft threads 91 reach the broadest area of the head 7, as shown in FIG. 4(b). Upon still further advancement into the final position, which is shown in FIG. 4(c), the weft threads 91 finally come to rest laterally on the base area 6 and thus below the projecting lower edges 71 of the head area 7. Due to the elasticity of the woven fabric 9, the weft threads 91 thus contract behind the projecting edges 71 at the base 6 of the fastening element 3 and therefore ensure that the fastening elements 3 of the mounting device 1 catch in the woven fabric 9.

Whether the fastening of the mounting device 1 in the woven fabric 9 is detachable or non-detachable is primarily a function, in addition to the embodiment of the woven fabric 9, of the implementation of the fastening projections 3. In principle, the connection between the fastening projections and the woven fabric is more difficult to detach the smaller the angle at which the projecting edge sections 71 run to the plane of the base plate 2. In addition, the connection is harder to detach the greater the width of the projecting sections 71.

FIGS. 5 and 6 are used to explain preferred dimensions and angles of the fastening elements 3 of a mounting device 1 according to the present invention. FIG. 5 shows a view of one of the lateral faces of a fastening element 3, and FIG. 6 shows a view of the right lateral edge of the fastening element 3 in FIG. 5. The preferred dimensions for symmetrical head designs are summarized in following Table 1. For the sake of better comparability, all height and width specifications are specified in their projection either parallel to the base plate plane or perpendicular thereto, because the relevant areas may be curved.

TABLE 1

| symmetrical head design | | | | | | |
|---|---|---|---|---|---|---|
| | | | | Preferred | Especially preferred | |
| Exemplary dimensions | Identification | Dimension/mm | | dimension/m | | dimension/mm |
| | | From | To | From | To | From | To |
| Total height | H | 0.5 | 20 | 0.5 | 6 | 0.5 | 3 |
| Width with projections | B | 0.5 | 20 | 0.5 | 8 | 0.5 | 4 |
| Base width | b | 0.2 | 18 | 0.2 | 6 | 0.2 | 3 |
| Sheet thickness | t | 0.1 | 10 | 0.1 | 5 | 0.1 | 2 |
| Height of the projection | $h_1$ | 0.1 | 19.5 | 0.1 | 5.5 | 0.1 | 2.5 |
| Width of the projection | $h_2$ | 0.1 | 5 | 0.1 | 3 | 0.1 | 2 |
| Distance of the projection from the base plate | $h_3$ | At least 1.4 times wire diameter | | | | | |
| Join/removal radius | $R_1$ | 0.1 | 5 | 0.2 | 3 | 0.2 | 2 |
| Transition radius | $R_2$ | At least 0.1 mm | | | | | |
| Radius at arrow tip | $R_3$ | 0.1 | 1 | 0.2 | 0.7 | 0.2 | 0.5 |
| Bending radius | $R_4$ | 0.1 | 0.6 | 0.2 | 0.4 | 0.2 | 0.3 |

| | | Dimension/° | | Preferred dimension/° | | Especially preferred dimension/° | |
|---|---|---|---|---|---|---|---|
| | | From | To | From | To | From | To |
| Join angle | α | 5 | 85 | 15 | 60 | 25 | 45 |
| | β | 0 | 70 | 0 | 60 | 0 | 45 |
| | γ | 70 | 110 | 85 | 95 | 89 | 91 |
| | δ | 70 | 110 | 85 | 95 | 89 | 91 |

Figure 7:
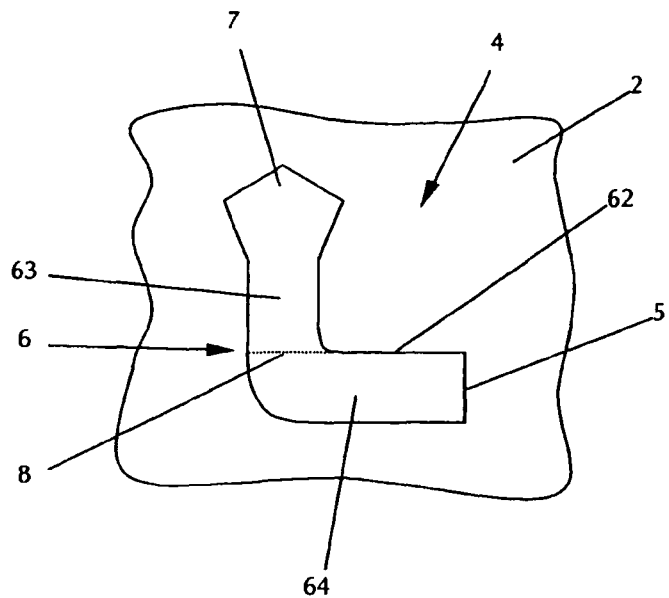
FIG. 7 a top view of a partial detail of a preliminary stage of a further mounting device having a fastening element which is punched out but not yet bent.
Figure 8:
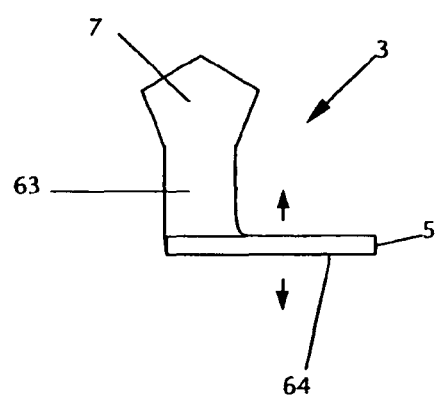
FIG. 8 a side view of the fastening element from FIG. 7, a part of the fastening element shown being bent out of the base plate plane.

FIGS. 7 and 8 show an alternative embodiment of a fastening element 3 and its blank. In contrast to the preceding embodiment, the base area 6 of the blank 4 illustrated in FIG. 7 is curved L-shaped. The horizontal leg 64 is still connected to the base plate 2 in the area of the connection edge 5. All remaining lateral edges and the lateral edges of the vertical leg 63 and the head 7 are cut free from the base plate 2. In contrast to the illustrations in the preceding figures, the blank 4 of FIG. 7 is not bent out of the base plate 2 around the connection edge 5, but rather around the bending edge 8 lying in the extension of the lateral edge 62. This results in the fastening element 3 illustrated in FIG. 8, which is solely connected via the connection edge 5 to the base plate 2. The horizontal leg 64 of the base area 6 may act in this way as a spring in the direction perpendicular to the base plate plane, as indicated by the two arrows in FIG. 8. Apart from the additional elasticity thus obtained, there is no significant difference to the fastening elements which were described in the preceding figures.

Figure 9:
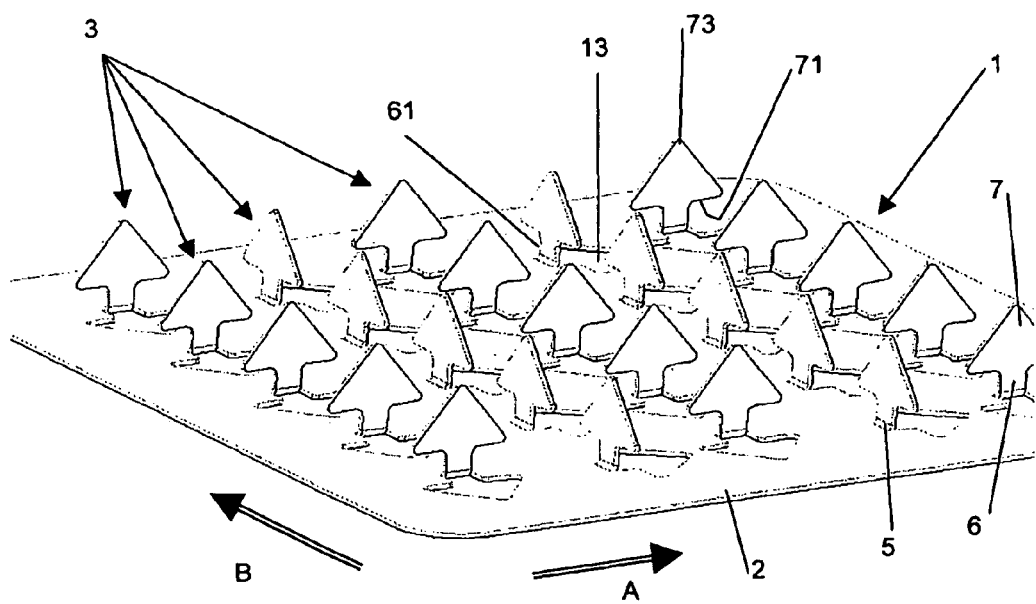
FIG. 9 a perspective partial view of a mounting device according to the present invention having a configuration of the fastening elements deviating from FIG. 1.

FIG. 9 shows a further exemplary embodiment of a mounting device 1 according to the present invention in a partial top view. While the fastening projections 3 in FIG. 1 are situated as rows of pairs diametrically opposite one another, in which the lateral edges 61 of the fastening projections are all oriented in the same direction or opposite thereto, the configuration here comprises rows of individual fastening projections 3, which also do not have webs 11, in contrast to FIG. 2. The lateral edges 61 of the fastening projections 3 point alternately in direction A or direction B from row to row, the directions A and B being situated perpendicularly to one another in the example shown. In addition to the unidirectional configuration of the fastening projections as in FIG. 1 and the bidirectional configuration comparable to FIG. 9, multidirectional configurations are also possible; bidirectional and multidirectional configurations are usually preferred in relation to unidirectional configurations, because they result in more stable connections to the counterparts.

Figure 10:
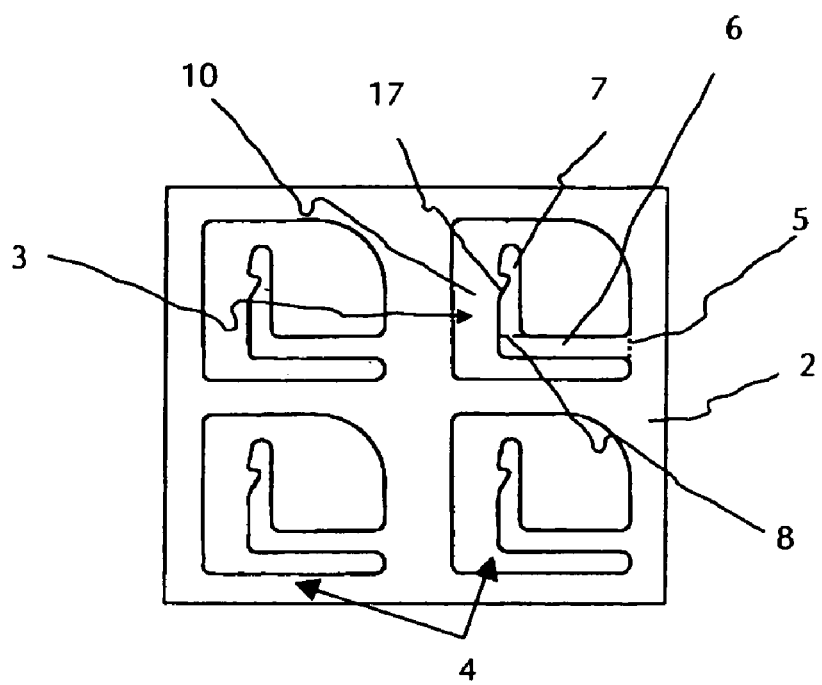
FIG. 10(a) a top view of a partial detail of a further mounting device having fastening elements which are punched out but not yet bent.
FIG. 10(b) a side view of a partial detail of illustration from FIG. 10(a), the head area of the fastening element shown being bent out of the base plate plane.
Figure 10:
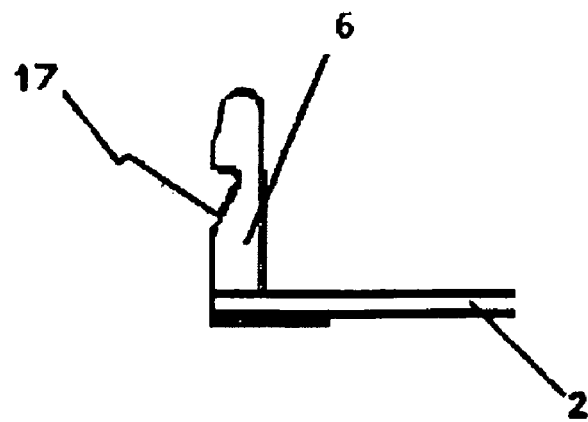

FIG. 10(a) is a top view of a partial detail of a further embodiment of a mounting device 1 according to the present invention. In this detail, four uniformly distributed fastening elements 3 are shown, which, like the embodiment of FIGS. 7 and 8, each have an L-shaped base area 6 curved at an angle of 90°, which continues in an essentially hooked head area 7. The hooked head area 7 has the form of a crochet hook and is thus designed asymmetrically in contrast to the preceding embodiments. It also comprises an essentially rectangular web having a rounded, upper end area. A notch 17 is implemented on one side of the head area 7. The notch 17 runs inward, into the head area 7, its upper leg running essentially horizontally, i.e., at an angle of 0° to the base plate 2, and the lower leg of the setback 17 runs diagonally downward. The fastening elements 3 in FIG. 10(a) are shown before bending, so that the entire fastening element 3 is still located in the base plate plane. The relief 10 around the contour of the blank 4 is similarly wide as in FIG. 2, but is implemented asymmetrically and has varying widths. The external edges of the relief 10 result in an approximately square shape having partially rounded corners, one outer edge being interrupted by the connection edge 5. It is thus possible to produce the fastening elements 3 from FIG. 10(a) using a standard punch die, which punches out an essentially square shape. In principle, however, it is preferable to punch out as little material as possible.

FIG. 10(b) shows a partial detail of illustration from FIG. 10(a) in a side view, one of the fastening elements 3 being illustrated. In contrast to the illustration from FIG. 10(a), a part of the base area 6 which continues in the hooked head area 7 is bent by an angle of approximately 90° out of the base plate plane around the bending edge 8. When the mounting device 1 is inserted into a counterpart (not shown here), the hooked head area 7 penetrates therein and its protrusion 14 may hook in the counterpart and thus produce the connection between counterpart and mounting device 1.

Figure 11:
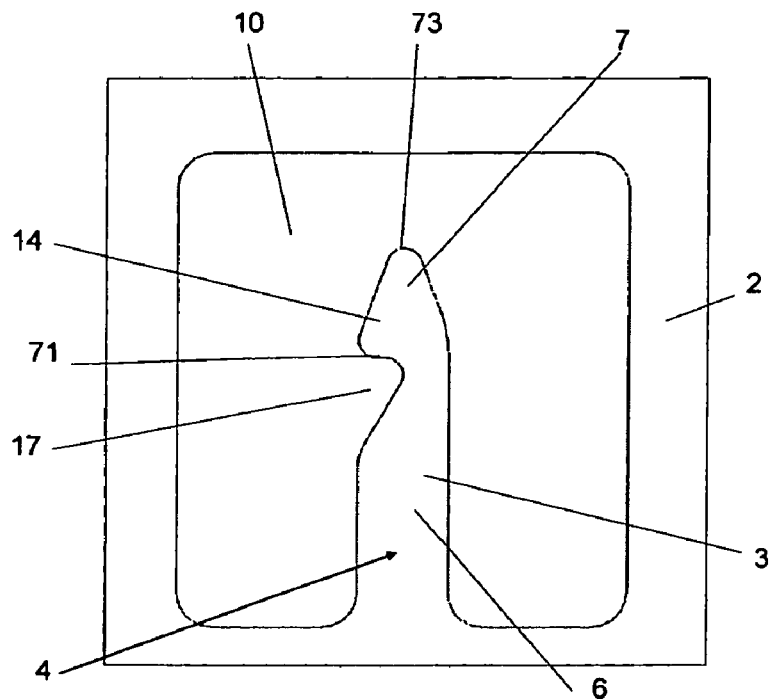
FIG. 11 a top view of a partial detail of a preliminary stage of a further mounting device having a fastening element which is punched out but not yet bent.

FIG. 11 shows a top view of a partial detail of a preliminary stage of a further mounting device having a fastening element which is punched out but not yet bent. This embodiment, like that of FIG. 10, has an asymmetrical head area 7 similar to a crochet hook having a setback 17 and a projection 14. The lower edge 71 of the projecting head area is implemented in such a way that it comes to rest parallel to the base plate after the fastening element 3 is bent out. The tip 73 of the head area 7 advantageously runs to a point, so that insertion into a counterpart is made easier.

Figure 12:
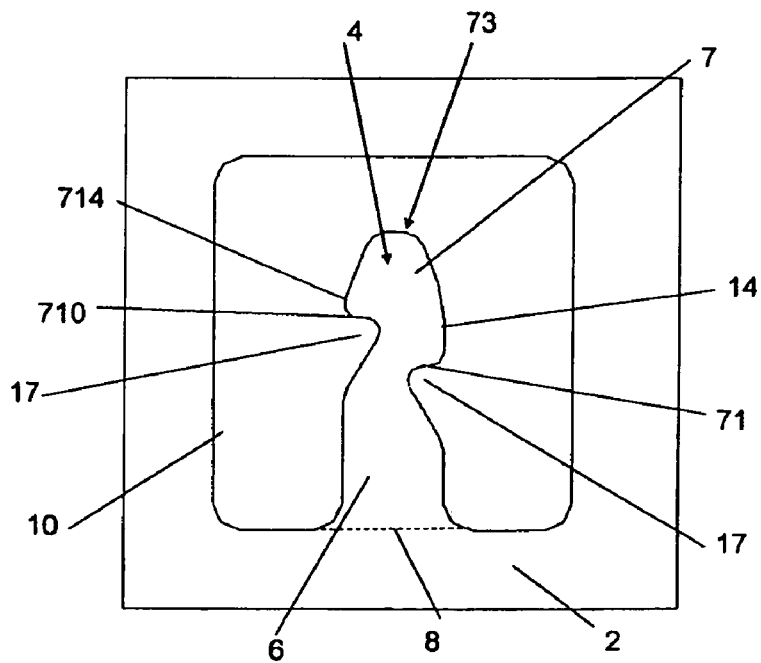
FIG. 12 a top view of a partial detail of a preliminary stage of a further mounting device having a fastening element which is punched out but not yet bent.

FIG. 12 illustrates a further asymmetrical embodiment of a blank of a fastening element which is punched out, but not yet bent out of the plane of the base plate. In addition to the projection 14 lying closer to the later bending edge 8, a distal projection 714 lying closer to the head area 7 is provided on the other side. The transition from base to head areas therefore does not run parallel to the later bending edge. Both projections are neighbored by notches 17 in the base area 6 and project beyond them. The lower edge of the projection 14 is implemented in such a way that it spans an angle of approximately 25° to the base plate in the bent-out state, which simplifies insertion into a counterpart. The projection 714 lying closer to the free end of the head area is designed in such a way that the lower edge 710 will run parallel to the base plate after bending, which improves the hold in the counterpart.

Figure 13:
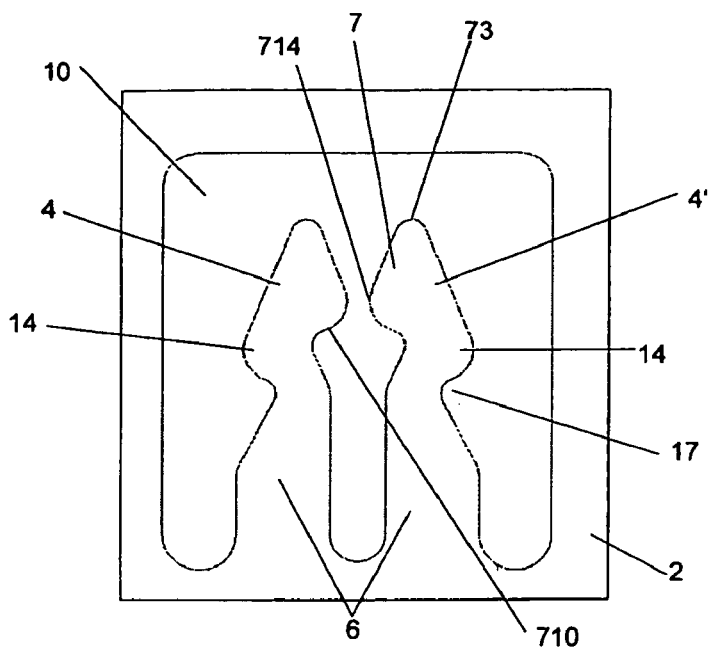
FIGS. 13(a) and (b) a top view in each case of a partial detail of a preliminary stage of a further mounting device having fastening elements which are punched out but not yet bent and are situated in pairs.
Figure 13:
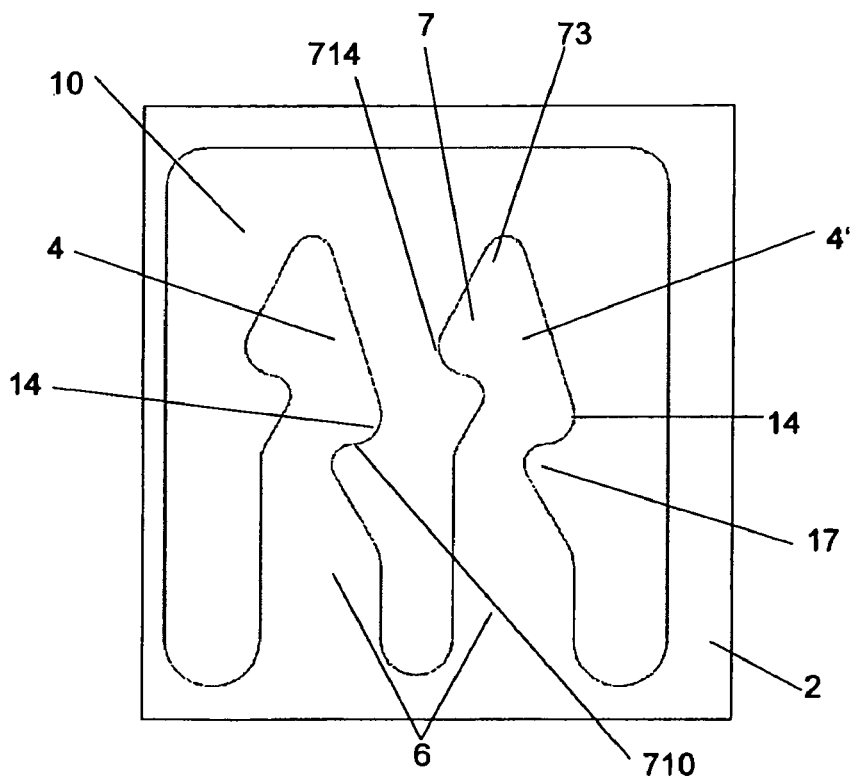

In FIGS. 13(a) and (b), two fastening elements similar to those of FIG. 12 are combined in pairs within a relief 10. The lower edge 710 of the projection 714 lying closer to the free end of the head area also has a larger angle of approximately 30-35°. While the fastening elements 4, 4' are situated mirror-symmetric to one another in FIG. 13(a), they are situated staggered in FIG. 13(b).

Figure 14:
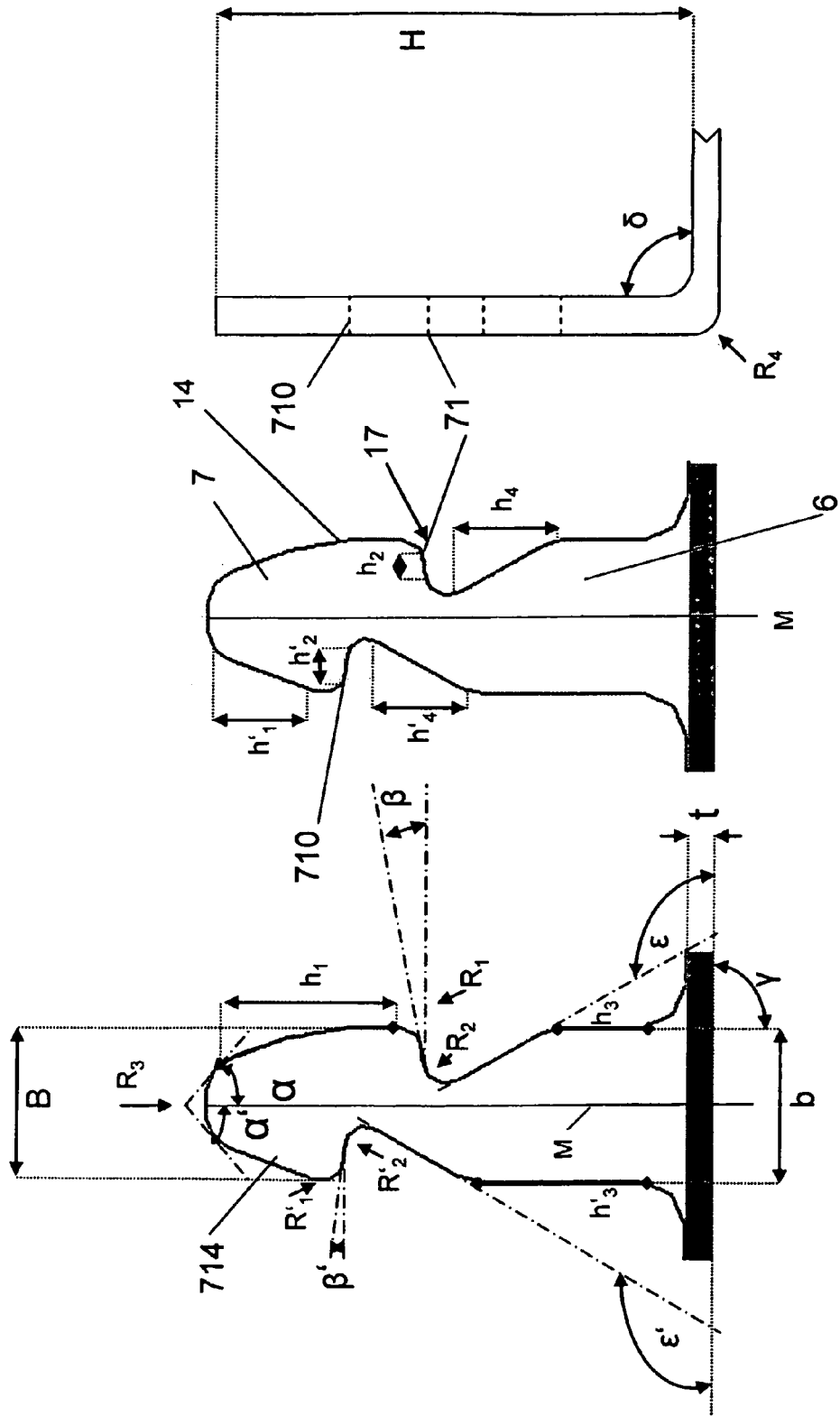
FIGS. 14(a) to (c) a fastening element of a mounting device according to the present invention in two top views of one of its lateral faces and a top view of one of its lateral edges, and FIG. 15 a perspective top view of a larger section of a mounting device having a larger number of fastening elements.

FIGS. 14(a) and (b) show top views of a lateral face and FIG. 14(c) shows a top view of the right lateral edge of a fastening element of a mounting device according to the present invention having asymmetrical design and projections 14, 714 situated on both sides. For the sake of better visibility, the top view of the lateral face is shown twice, the relevant reference signs and angles being distributed on both illustrations 14(a) and 14(b). These largely correspond to those of FIGS. 5 and 6, two specifications for the right and left halves resulting because of the asymmetrical design for many dimensions, of which the second dimension, which is assigned to the left half, is identified by an apostrophe. In addition to the angles from FIGS. 5 and 6, an angle ϵ is introduced which describes the lower setback of the notch 17 or 710 in relation to the base plate plane. In addition, the height $h_4$ of the setback is also introduced. For the sake of better comparability, all height and width specifications are specified in their projection either parallel to the base plate plane or perpendicular thereto, because the relevant areas are strongly curved.

As for the symmetrical embodiment, the dimensions and angles are also summarized in a table for the asymmetrical embodiment.

TABLE 2

| | | | | | | | | |
|---|---|---|---|---|---|---|---|---|
| | | colspan="8" | asymmetrical head design | | | | | |

| Exemplary dimensions | Identification | Dimension/mm | | Preferred dimension/m | | Especially preferred dimension/mm | | Asymmetry |
|---|---|---|---|---|---|---|---|---|
| | | From | To | From | To | From | To | |
| Total height | H | 0.5 | 20 | 0.5 | 6 | 0.5 | 3 | Not possible |
| Width with projections | B | 0.3 | 20 | 0.3 | 8 | 0.3 | 4 | Possible |
| Base width | b | 0.2 | 18 | 0.2 | 6 | 0.2 | 3 | Not possible |
| Sheet thickness | t | 0.1 | 10 | 0.1 | 5 | 0.1 | 2 | Not possible |
| Height of the projection | $h_1, h'_1$ | 0.1 | 19.5 | 0.1 | 5.5 | 0.1 | 2.5 | Possible |
| Width of the projection | $h_2, h'_2$ | 0.1 | 5 | 0.1 | 3 | 0.1 | 2 | Possible |
| Distance of the projection from the base plate | $h_3, h'_3$ | 0.1 | 15 | 0.1 | 4 | 0.1 | 1.5 | Possible |
| Height of the setback | $h_4, h'_4$ | 0.1 | 15 | 0.3 | 4 | 0.3 | 2 | Possible |
| Join/removal radius | $R_1, R'_1$ | 0.1 | 5 | 0.1 | 3 | 0.1 | 2 | Possible |
| Transition radius | $R_2, R'_2$ | At least 0.1 mm | | | | | | Possible |
| Radius at arrow tip | $R_3$ | 0.1 | 1 | 0.1 | 0.7 | 0.1 | 0.5 | Possible |
| Bending radius | $R_4$ | 0.1 | 0.6 | 0.1 | 0.4 | 0.1 | 0.3 | Not possible |

| | | Dimension/° | | Preferred dimension/° | | Especially preferred dimension/° | | |
|---|---|---|---|---|---|---|---|---|
| | | From | To | From | From | To | From | |
| Join angle | $\alpha, \alpha'$ | 5 | 85 | 15 | 60 | 15 | 45 | Possible |
| | $\beta$ | 0 | 70 | 0 | 60 | 0 | 45 | |
| | $\beta'$ | −45 | 70 | −30 | 60 | −20 | 45 | |
| | $\gamma, \gamma'$ | 45 | 135 | 70 | 135 | 89 | 91 | Possible |
| | $\delta$ | 70 | 110 | 85 | 95 | 89 | 91 | Not possible |
| Lower setback angle | $\epsilon, \epsilon'$ | 90 | 160 | 100 | 150 | 110 | 135 | Possible |

Figure 15:
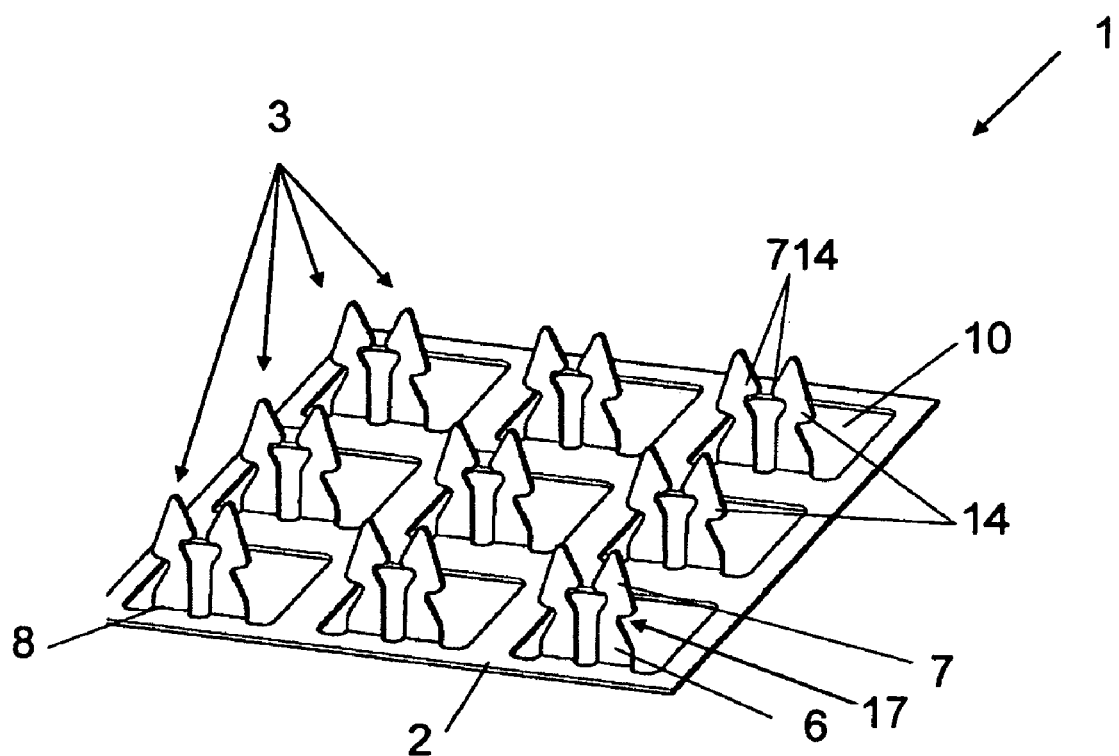

Finally, a perspective top view of a larger section of a metal plate having 18 fastening elements 3 is reproduced in FIG. 15. As in FIG. 13(a) the fastening elements 3 are punched free in pairs, the pairs being situated mirror symmetric to one another.

The invention claimed is:

1. A mounting device having a metallic base plate, on which multiple fastening elements are provided, from each of which at least a partial area projects above the base plate, characterized in that it is obtainable by:
    a) incising multiple blanks of the fastening elements into the surface of the base plate while leaving one connection edge per blank, and
    b) bending at least a partial area of the blanks out of the base plate around at least one bending edge located in the base area,
    the blanks being implemented in such a way that they each have a web-shaped base area, which comprises the connection edge on one end, and a head area adjoining the base area, the head area projecting laterally beyond the neighboring base area on at least one side and the projecting edge of the head area adjoining the base area running at an angle between 0° and 70° in relation to the plane of the base plate after the fastening elements are bent out of the base plate.

2. The mounting device according to claim 1, wherein the angle between the projecting edge of the head area and the plane of the base plate is 0° to 60°.

3. The mounting device according to claim 2, wherein the base area of the blank is implemented as curved.

4. The mounting device according to claim 3, wherein the base area of the blank is implemented as curved essentially L-shaped.

5. The mounting device according to claim 3, wherein the base area of the blank is implemented as curved, the angle of curvature being between 70° and 110°.

6. The mounting device according to claim 5, wherein the base area of the blank is implemented as curved, the angle of curvature being essentially 90°.

7. The mounting device according to claim 3, wherein the bending edge is in the curved area of the base area.

8. The mounting device according to claim 7, wherein the bending edge is in an extension of a lateral edge of the base area, and a further bending edge is formed by the connection edge.

9. The mounting device according to claim 7, wherein the head area and at least a part of the base area adjoining it are bent out at an angle of 70 to 110°.

10. The mounting device according to claim 9, wherein the head area and at least a part of the base area adjoining it are bent out at an angle of 85 to 95°.

11. The mounting device according to claim 10, wherein the head area and at least a part of the base area adjoining it are essentially perpendicularly in relation to the plane of the base plate.

12. The mounting device according to claim 1, wherein the head area tapers toward its free end.

13. The mounting device according to claim 12, wherein the upper lateral edge running toward the free end of the head area forms an angle of 5° to 85° in relation to a straight line running perpendicularly to the base plate through the tip of the head.

14. The mounting device according to claim 13, wherein the upper lateral edge running toward the free end of the head area forms an angle of 15° to 60° in relation to a straight line running perpendicularly to the base plate through the tip of the head.

15. The mounting device according to claim 14, wherein the upper lateral edge running toward the free end of the head area forms an angle of 15° to 45° in relation to a straight line running perpendicularly to the base plate through the tip of the head.

16. The mounting device according to claim 13, wherein the blanks incised into the base plate have projecting head areas on both sides of the base area and are implemented as essentially mirror-symmetric in regard to their longitudinal central axis and particularly arrow-shaped or mushroom-shaped.

17. The mounting device according to claim 12, wherein the blanks incised in the base plate have a projecting head area on only one side of the base area.

18. The mounting device according to claim 12, wherein the blanks incised in the base plate have a head area projecting on both sides of the upper end of the base area, the lower edges of the projections having different distances to the bending edge.

19. The mounting device according to claim 18, wherein the projecting lower edge of a projection in the head area lying further away from the bending edge runs at an angle between −45° and 70°, in relation to the plane of the base plate after the fastening elements are bent out of the base plate.

20. The mounting device according to claim 19, wherein the projecting lower edge of a projection in the head area lying further away from the bending edge runs at an angle between −30° and 60°, in relation to the plane of the base plate after the fastening elements are bent out of the base plate.

21. The mounting device according to claim 19, wherein the projecting lower edge of a projection in the head area lying further away from the bending edge runs at an angle between −20° and 45°, in relation to the plane of the base plate after the fastening elements are bent out of the base plate.

22. The mounting device according to claim 12, wherein the fastening elements are situated in groups or as pairs.

23. The mounting device according to claim 22, wherein the fastening elements project above the base plate in different orientations.

24. The mounting device according to claim 23, wherein the fastening elements are implemented essentially identically and are distributed essentially uniformly on the surface of the base plate.

25. The mounting device according to claim 1, wherein the fastening elements are implemented to engage in a counterpart.

26. The mounting device according to claim 25, wherein the counterpart is selected from the group consisting of stainless steel, austenitic stainless steel, austenitic molybdenum steel, a high-temperature alloy, and a nickel alloy.

27. The mounting device according to claim 25, wherein the counterpart comprises glass fiber or ceramic fiber.

28. The mounting device according to claim 25, wherein the counterpart is selected from the group consisting of crocheted fabric, knitted fabric, braid, scrim, plush, and looped fleece.

29. The mounting device according to claim 28, wherein the mounting device is attached to a carrier component.

30. The mounting device according to claim 28, wherein the mounting device is integrated in a carrier component.

31. The mounting device according to claim 25, wherein the counterpart is a woven fabric having an open screen area of 25 to 75%.

32. The mounting device according to claim 31, wherein the counterpart is a woven fabric having an open screen area of 40 to 70%.

33. The mounting device according to claim 32, wherein the counterpart is a woven fabric having an open screen area 50 to 65%.

34. The mounting device according to claim 31, wherein the counterpart is a woven fabric having a mesh width of 0.3 mm to 18 mm.

35. The mounting device according to claim 34, wherein the counterpart is a woven fabric having a mesh width of 0.3 mm to 10 mm.

36. The mounting device according to claim 35, wherein the counterpart is a woven fabric having a mesh width of 0.3 mm to 3 mm.

37. The mounting device according to claim 31, wherein the woven fabric is made of threads having a diameter of 0.1 mm to 3 mm.

38. The mounting device according to claim 37, wherein the woven fabric is made of threads having a diameter of 0.2 mm to 2 mm.

39. The mounting device according to claim 38, wherein the woven fabric is made of threads having a diameter of 0.3 mm to 1 mm.

40. The mounting device according to claim 37, wherein the width, by which the head area projects laterally beyond the adjoining base area corresponds to at least 0.3 times the thread diameter.

41. The mounting device according to claim 40, wherein the width, by which the head area projects laterally beyond the adjoining base area corresponds to at least 0.5 times the thread diameter.

42. The mounting device according to claim 31, wherein a fastening element engages between two neighboring warp or weft threads.

43. The mounting device according to claim 2, wherein the angle between the projecting edge of the head area and the plane of the base plate is 0° to 45°.

44. The mounting device according to claim 1, wherein the base area is implemented as strip-like and essentially rectangular.

45. The mounting device according to claim 1, wherein the base area has setbacks or notches in the area facing away from the connection edge.

46. The mounting device according to claim 45, wherein the web width in the web-shaped base area is greatest in the area of the connection edge.

47. The mounting device according to claim 46, wherein the web-shaped base area has a bending edge in the area of the connection edge and a bending edge running transversely to its longitudinal extension direction in the area between connection edge and head area.

48. A method for producing a mounting device comprising the following steps:
   a) incising multiple blanks of fastening elements into a surface of a base plate while leaving one connection edge per blank, and
   b) bending at least a partial area of the blanks out of the base plate around at least one bending edge located in a base area,
   the blanks being implemented in such a way that they each have a web-shaped base area, which comprises the connection edge on one end, and a head area adjoining the base area, the head area projecting laterally on at least one side of the neighboring base area and the projecting edge of the base area adjoining the base area running at an angle between 0° and 70° in relation to the plane of the base plate after the fastening elements are bent out of the base plate.

49. The mounting device according to claim 47, wherein the web-shaped base area has a bending edge running transversely to its longitudinal extension direction in the area between connection edge and head area.

50. The method according to claim 48, wherein the steps a) and b) are executed using a progressive die or as a rolling continuous method.

51. The method according to claim 48, wherein the blanks incised into the base plate are produced using a laser beam or by punching.

52. The method according to claim 51, wherein a relief is generated around the blanks as they are incised.

53. The method according to claim 52, wherein at least one pair of essentially diametrically opposite fastening projections is generated in such a way that a web delimited by the connection edges remains between the cut-free blanks and the blanks are bent out of the base plate toward one another.

54. The method according to claim 52, wherein the fastening projections are oriented to a raster, the direction of the bending angle also being oriented to a raster.

* * * * *